United States Patent [19]

Jurovics et al.

[11] Patent Number: 5,675,820
[45] Date of Patent: Oct. 7, 1997

[54] GUIDED OUTLINING METHOD

[76] Inventors: Raachel N. Jurovics, 4826 Rembert Dr., Raleigh, N.C. 27612; Harriet H. Rosen, 34 Montclair Avenue, Toronto, Ontario, Canada, M4V 1W1

[21] Appl. No.: 23,556

[22] Filed: Feb. 26, 1993

[51] Int. Cl.⁶ .................................................. G06F 17/21
[52] U.S. Cl. ........................... 395/793; 395/201; 395/761
[58] Field of Search ................................ 364/401, 402, 364/400, 419.01, 419.1, 419.17, 419.19, 419.2; 395/909, 917, 925, 927, 934, 902, 201, 207, 751, 761, 793, 794, 607; 434/236

[56] References Cited

U.S. PATENT DOCUMENTS

| | | | |
|---|---|---|---|
| 4,992,939 | 2/1991 | Tyler | 364/401 |
| 5,043,891 | 8/1991 | Goldstein et al. | 395/902 |
| 5,153,830 | 10/1992 | Fisher et al. | 364/419.2 |
| 5,200,893 | 4/1993 | Ozawa et al. | 364/419.1 |

*Primary Examiner*—Robert A. Weinhardt
*Attorney, Agent, or Firm*—Rhodes, Coats & Bennett, L.L.P.

[57] ABSTRACT

A guided outlining system to assist the user in developing strategy-specific outlines for business communications. The user is prompted to enter the target audience, purpose and specific content entries for the business communication. One strategy choice from a predefined list of strategy options is also selected by the user. Strategy guidelines are displayed for the user to assist in the organization of the content entries based on the selected strategy. The user is then prompted to assign type attributes and ordering criteria to each content entry. The content entries are then sorted and displayed to the user.

5 Claims, 18 Drawing Sheets

Fig. 8

```
═══════════ ActionWriter - BLF ═══════════
  File      Panel      Help            File: CONFRPT
═══════════════════ Audience ═══════════════════

Who will read this document?

Target Audience    [ HR Exempt Employees ]

Extended Audience  [ Roberta McClendon ]

══ Summary ══
                      Detail (F5)         Next (F10)

Target Audience:
  Extended Audience:
  Purpose:

Audience  Purpose  Content  Strategy  Grouping  Ordering  Display
```

Fig. 10

=== ActionWriter - BLF ===

| File | Panel | Help | | File: CONFRPT |

Effective business messages provoke action.

Define why you are writing this message.
Whenever possible, specify a response deadline or follow-up date.

Please complete HR Conference Evaluation

Detail (F5)    Long-Term (F6)    Previous (F9)    Next (F10)

=== Summary ===

Target Audience: HR Exempt Employees
Extended Audience: Roberta McClendon
Purpose:

Audience   Purpose   Content   Strategy   Grouping   Ordering   Display

Fig. 11

```
═════ ActionWriter - BLF ═════════════════════
  File      Panel      Help              File: CONFRPT ═════ Purpose Detail ═════

In what way is it in your audience's interest to act on your message?
Specify audience benefits or concerns:

┌─────────────────────────────┐
│                             │
│                             │
│                             │
└─────────────────────────────┘

Who takes the next step? By what deadline?

┌─────────────────────────────┐
│                             │
└─────────────────────────────┘

Long-Term (F6)    Previous (F9)       Next (F10)
═════ Summary ═════

Target Audience: HR Exempt Employees
Extended Audience: Roberta McClendon
Purpose: Please complete HR Conference Evaluation Audience   Purpose   Content   Strategy   Grouping   Ordering   Display
```

Fig. 12

```
======ActionWriter - BLF======
  File      Panel      Help                    File: CONFRPT
  ======Long-Term Purpose======

If you are pursuing a long-term purpose, indicate how this message will
  help you achieve it.

List follow-up messages that may move you closer to your long-term goal:

┌─────────────────────────┐
  │                         │
  │                         │
  │                         │
  └─────────────────────────┘

Previous (F9)         Next (F10)
  ======Summary======
  Target Audience:  HR Exempt Employees
  Extended Audience:  Roberta McClendon
  Purpose:  Please complete HR Conference Evaluation
```

Audience   Purpose   Content   Strategy   Grouping   Ordering   Display

Fig. 13

ActionWriter - BLF

File    Panel    Help    File: CONFRPT

Content

Using key words or short phrases, list the ideas that support your purpose:

| | |
|---|---|
| committee volunteers<br>next year's program<br>due by Jan 15<br>please complete evaluation<br>evaluation form includes:<br>summary of outcomes<br>objectives<br>alternative location ideas?<br>thank you<br>transportation | location<br>program<br>meals<br>non-exempts<br>recreation<br>will review at Jan 18 retreat<br>Pls meet Jan 15 deadline<br>cc: Roberta McClendon<br>alternative contents? |

Previous (F9)    Next (F10)

Summary

Target Audience: HR Exempt Employees
Extended Audience: Roberta McClendon
Purpose: Please complete HR Conference Evaluation Audience   Purpose   Content   Strategy   Grouping   Ordering   Display

Fig. 15

```
═══════ ActionWriter - BLF ═══════                    File: CONFRPT
File      Panel      Help
         ═══════ Persuasive (Direct) Strategy ═══════

Purpose     Focus     Organization

Connect by: setting forth what you request and the action(s) you
expect in the simplest possible terms. Be courteous, positive,
and direct.

Support by: showing why it is in the audience's interest to help
you achieve your goal. Provide explanatory or background detail
that illustrates the reasonableness of your request or the validity
of your claim.

Follow-through by: referring again to the desired course of action
(how, where, who). Keep the follow-up initiative by setting a
completion date. If appropriate, thank your audience for helping.

Tab           Sample (F7)             Previous (F9)         Next (F10)

Audience  Purpose  Content  Strategy  Grouping  Ordering  Display
```

Fig. 16

```
======================= ActionWriter - BLF =======================
   File        Panel        Help                    File: CONFRPT
================================ Grouping ================================

For each item, select either (c)onnect, (s)upport, or (f)ollow-through.

c   committee volunteers            s   location
   c   next year's program             s   program
   c   due by Jan 15                   s   meals
   c   please complete evaluation      f   non-exempts
   s   evaluation form includes:       s   recreation
   f   summary of outcomes             f   will review at Jan 18 staff mtg
   s   objectives                      f   Pls meet Jan 15 deadline
   s   alternative location ideas?     f   cc: Roberta McClendon
   f   thank you                       s   alternative contents?
   s   transportation Sample (F7)      Previous (F9)         Next (F10)
================================ Summary ================================
Target Audience:  HR Exempt Employees
Extended Audience:  Roberta McClendon
Purpose:  Please complete HR Conference Evaluation
```

Audience    Purpose    Content    Strategy    Grouping    Ordering    Display

```
========== ActionWriter - BLF ==========
File        Panel        Help                          File:
========== Ordering Connect ==========
```

Enter ¶ (for "paragraph") to select each main idea. Then, assign each detail idea to a paragraph by entering the paragraph number. Change any paragraph or detail assignment by entering its new number.

```
1¶    please complete evaluation
1a       due by Jan 15
2¶    committee volunteers
2a    next year's program
```

Sample (F7)      Previous (F9)      Next (F10)

Audience    Purpose    Content    Strategy    Grouping    Ordering    Display

```
═══════ ActionWriter - BLF ═══════

File      Panel      Help                    File: CONFRPTI
═════════════════════════ Display ═════════════════════════

Connect:
   please complete evaluation
      due by Jan 15
   committee volunteers
   next year's program Support:
   evaluation form includes:
      objectives
      program
      alternative contents?
      location
      alternative location ideas?
      meals
      transportation
      recreation Follow-Through:
   thank you
   Pls meet Jan 15 deadline Previous (F9)                                        Export
```

Audience   Purpose   Content   Strategy   Grouping   Ordering   Display

GUIDED OUTLINING METHOD

BACKGROUND OF THE INVENTION

Outlines are a useful writing tool to help writers organize their writings. An outline usually consists of a series of key words or short phrases that represent the ideas being conveyed. Related ideas are grouped according to a hierarchical system which usually includes one or more main ideas and supporting ideas. The main ideas and supporting ideas are ranked based on a variety of factors such as time, steps, importance, or random association. By taking the time to outline, patterns of ideas can be discerned which can be used by the writer to give direction or focus to his or her writings.

While outlining methods are useful for virtually any type of writing, the organizational strategies used to develop outlines may vary from one type of writing to another and reflect varying conventions. Most business letters, for instance, fit in one of five overall organizational strategies. These strategies are referred to as informational, follow-up, positive, sensitive, and persuasive (direct and indirect). By understanding these strategies and taking the time to organize thoughts into an outline, more effective communication can be achieved.

While most outlining is still typically done on a note pad, a number of computer programs have been developed to assist writers in developing outlines. Outlining programs usually fall into one of two categories. Many outlining programs are "add-ons" to larger programs, such as word-processing and text-editing programs. Other outlining programs function as stand-alone programs. Most prior-art outlining programs, whether add-ons or stand-alone programs, function merely as specialized text editors which show the hierarchial structure of the outline. The user first enters a heading and then enters subordinate ideas under the heading. The headings and subordinate ideas are arranged by the user either during the initial entry of the idea, or by moving and repositioning an idea previously entered.

While prior art outlining programs are useful for organizing ideas contained in a document or writing, they still have several limitations. For example, the prior-art outlining programs do not provide any guidelines or organizational strategies to help the writer organize his or her ideas. Also, outlining programs used in the past are generic, rather than being tailored for specific purposes. Currently, there is a need for outlining programs specifically tailored for business users.

SUMMARY AND OBJECTS OF THE INVENTION

The present invention is a guided outlining method implemented through computer software which facilitates the development of strategy-specific outlines for business communications. The user is prompted to enter the target audience, purpose and specific content entries for the business communication. The user makes a strategy selection from a predefined list of strategies. Strategy guidelines, based on the user selection, are displayed to the user to assist in the organization of the content entries. The organizational strategies provide criteria for ranking the content entries based on six basic patterns. The content entries are then ordered by first assigning a type attribute to the content entries. The content entries are grouped by type attribute and the user is prompted to enter ordering criteria for the content entries in each attribute grouping. Once the ordering criteria has been entered, the content entries are sorted and displayed to the user in outline format.

By using the outlining method of the present invention, the user creates a pattern that provides clarity of intention for business purposes. The audience and purpose of a document are focused giving the user an evaluation tool for assessing the document's potential content, as well as a means for arranging the document's message most effectively.

Based on the foregoing, it is a primary object of the present invention to provide an outlining method specifically tailored to business users for organizing ideas contained in business communications.

Another object of the present invention is to provide an outlining method implemented through software which provides strategy-specific guidelines to the user based on an organizational strategy selected by the user.

Another object of the present invention is to provide an outlining method which enables business users to write more effective communications.

Still another object of the present invention is to provide an outlining method which reduces the time needed to organize and write business communications, thereby increasing productivity of personnel in a business.

Other objects and advantages of the present invention will become apparent and obvious from a study of the following description and the accompanying drawings which are merely illustrative of such invention.

BRIEF DESCRIPTION OF THE DRAWINGS

FIG. 8 is a pictorial representation of audience screen.

FIG. 10 is a pictorial representation of the purpose screen.

FIG. 11 is a pictorial representation of the purpose detail screen.

FIG. 12 is a pictorial representation of the long-term purpose screen.

FIG. 13 is a pictorial representation of the content screen.

FIG. 15 is a pictorial representation of one of the strategy screens.

FIG. 16 is a pictorial representation of the grouping screen.

FIG. 17 is a pictorial representation of one of the ordering screens.

FIG. 18 is a display screen for displaying the final outline.

DETAILED DESCRIPTION OF THE INVENTION

The present invention provides a guided outlining method to assist business users in developing strategy-specific outlines for business communications. The invention is implemented by software operating on a general purpose computer which includes input means for entering data and commands, data storage means for storing data, and a display means. The outlining method of the present invention can be divided into seven distinct steps: (1) identifying the target audience; (2) identifying the purpose of the communication; (3) listing one or more content items which represent the ideas or messages being conveyed; (4) selecting an organizational strategy from a predefined list of strategy options; (5) grouping the content entries by type attribute (connect, support or follow-through); (6) assigning ordering criteria to the content entries in each attribute grouping; and (7) sorting and displaying the content entries.

Figure 1:
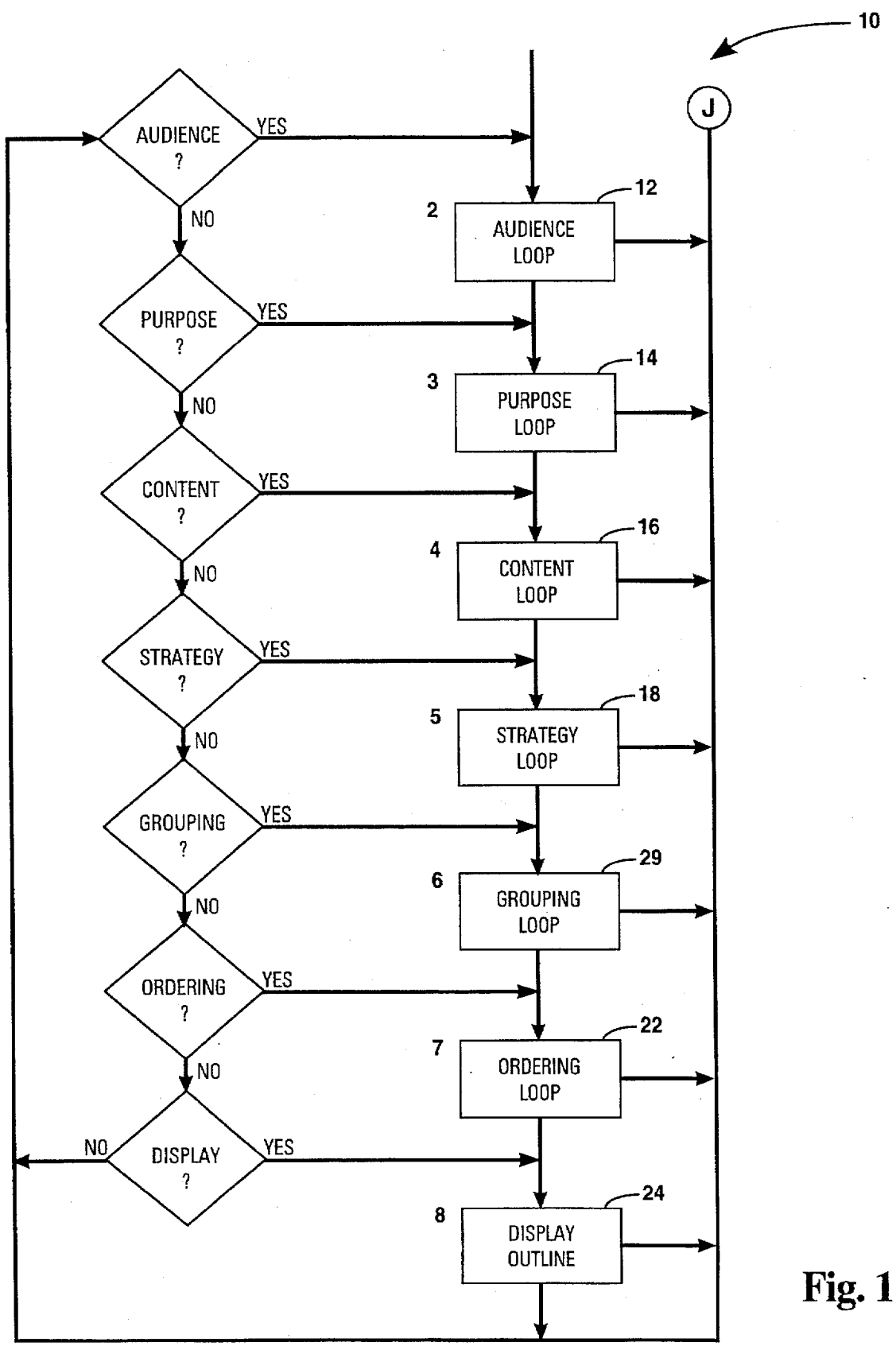
FIG. 1 is a flow diagram illustrating the program flow.
Figure 2:
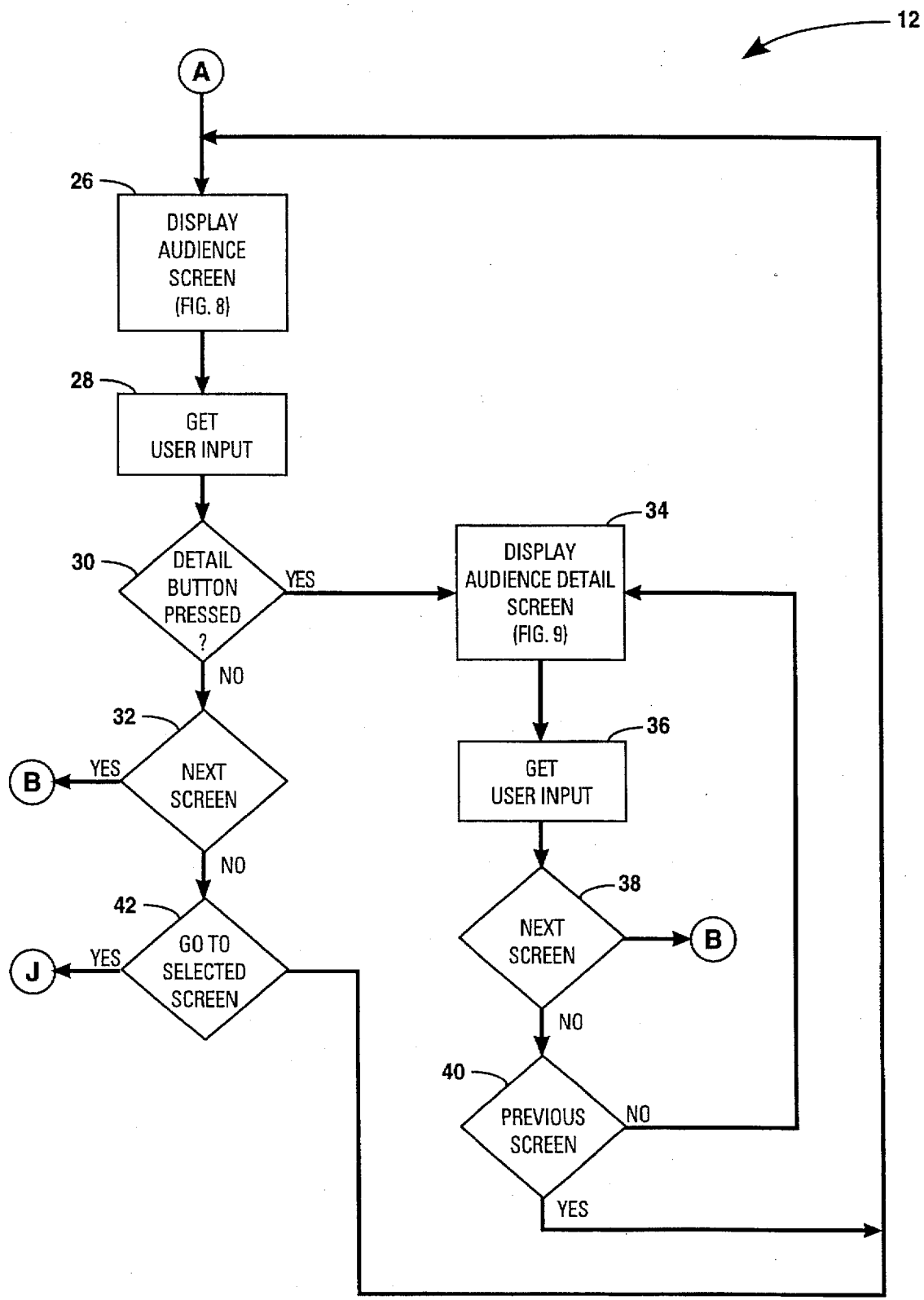
FIG. 2 is a flow diagram of the audience module of the program.
Figure 3:
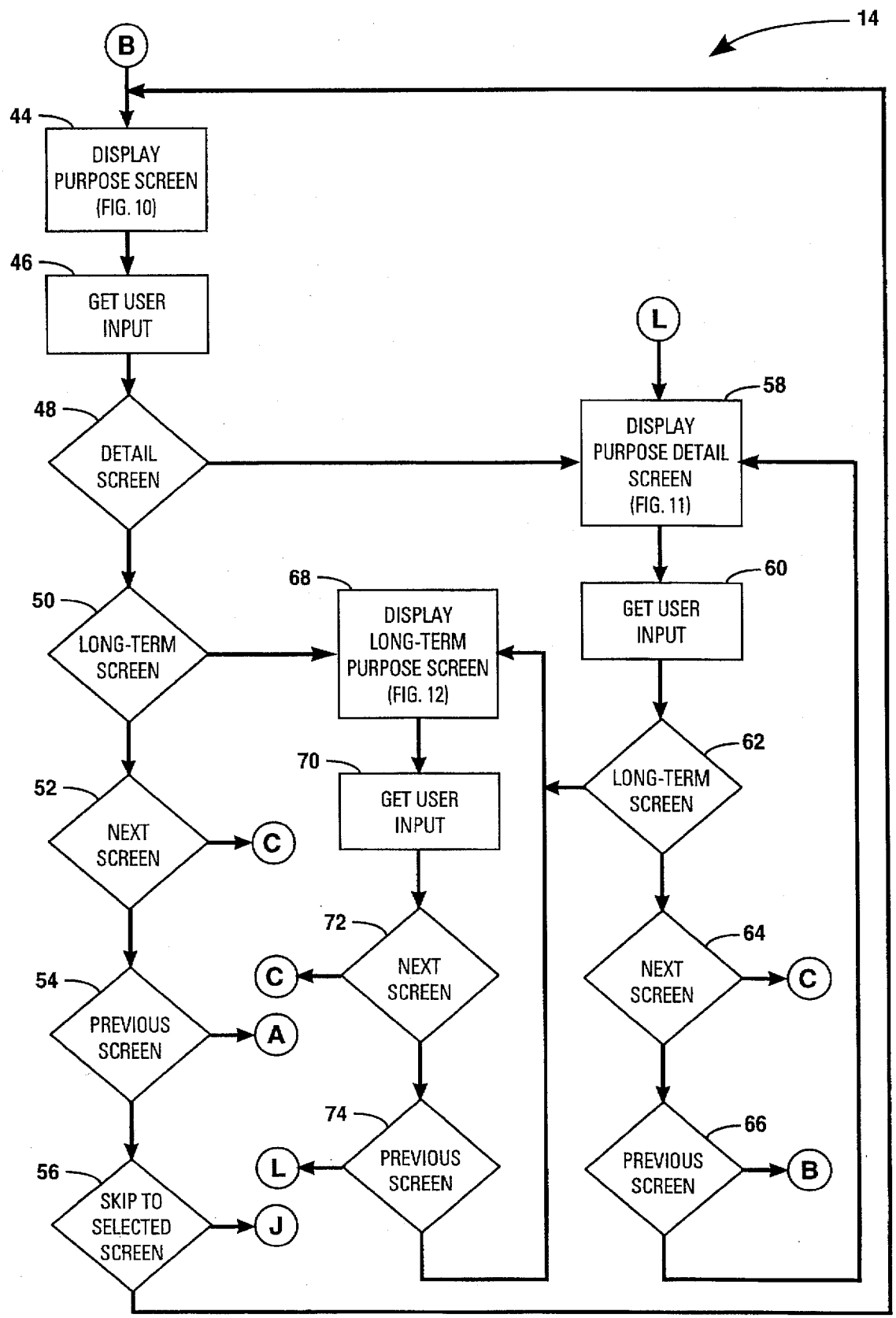
FIG. 3 is a flow diagram of the purpose module of the program.
Figure 4:
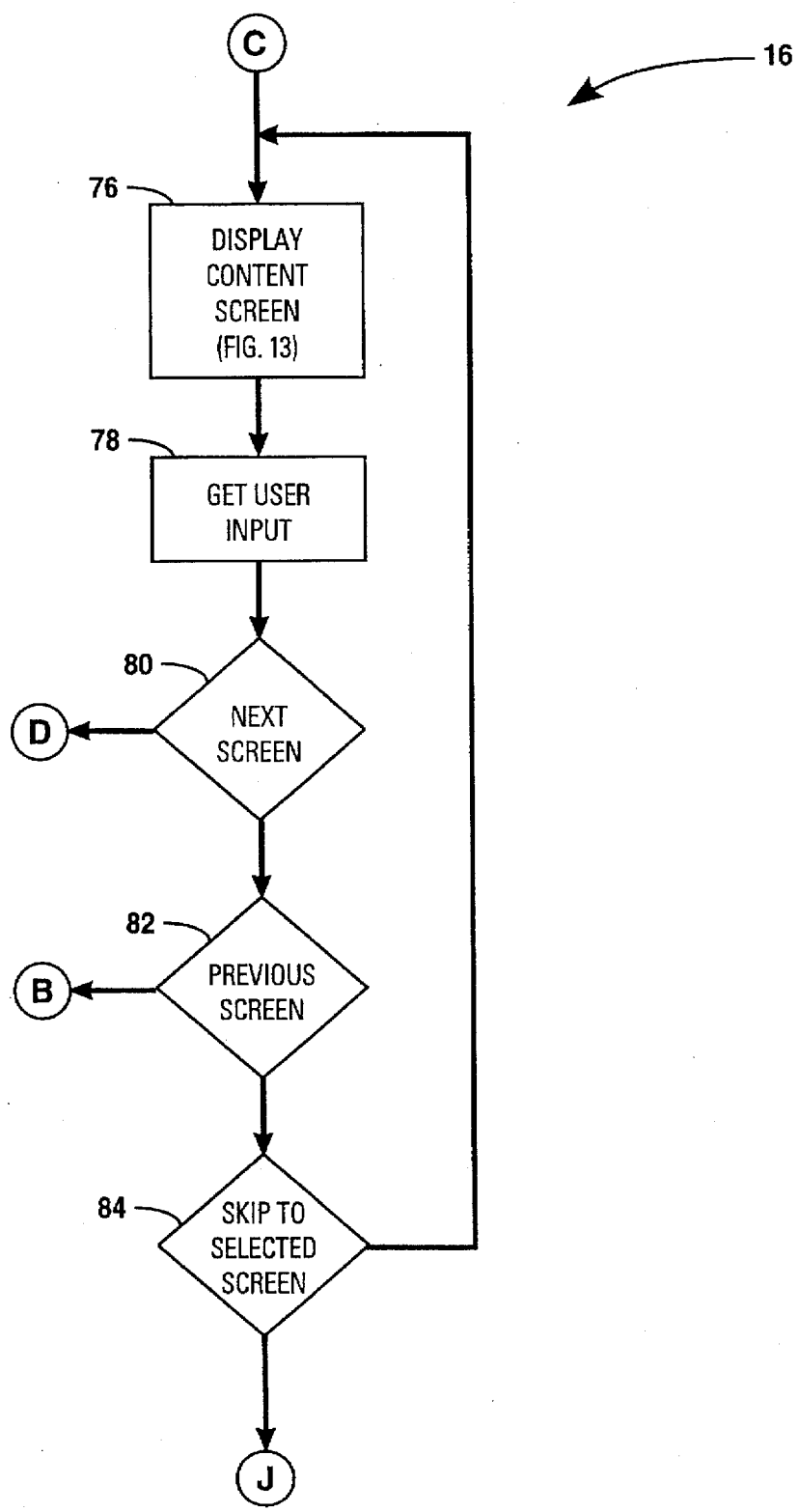
FIG. 4 is a flow diagram of the content module of the program.
Figure 5:
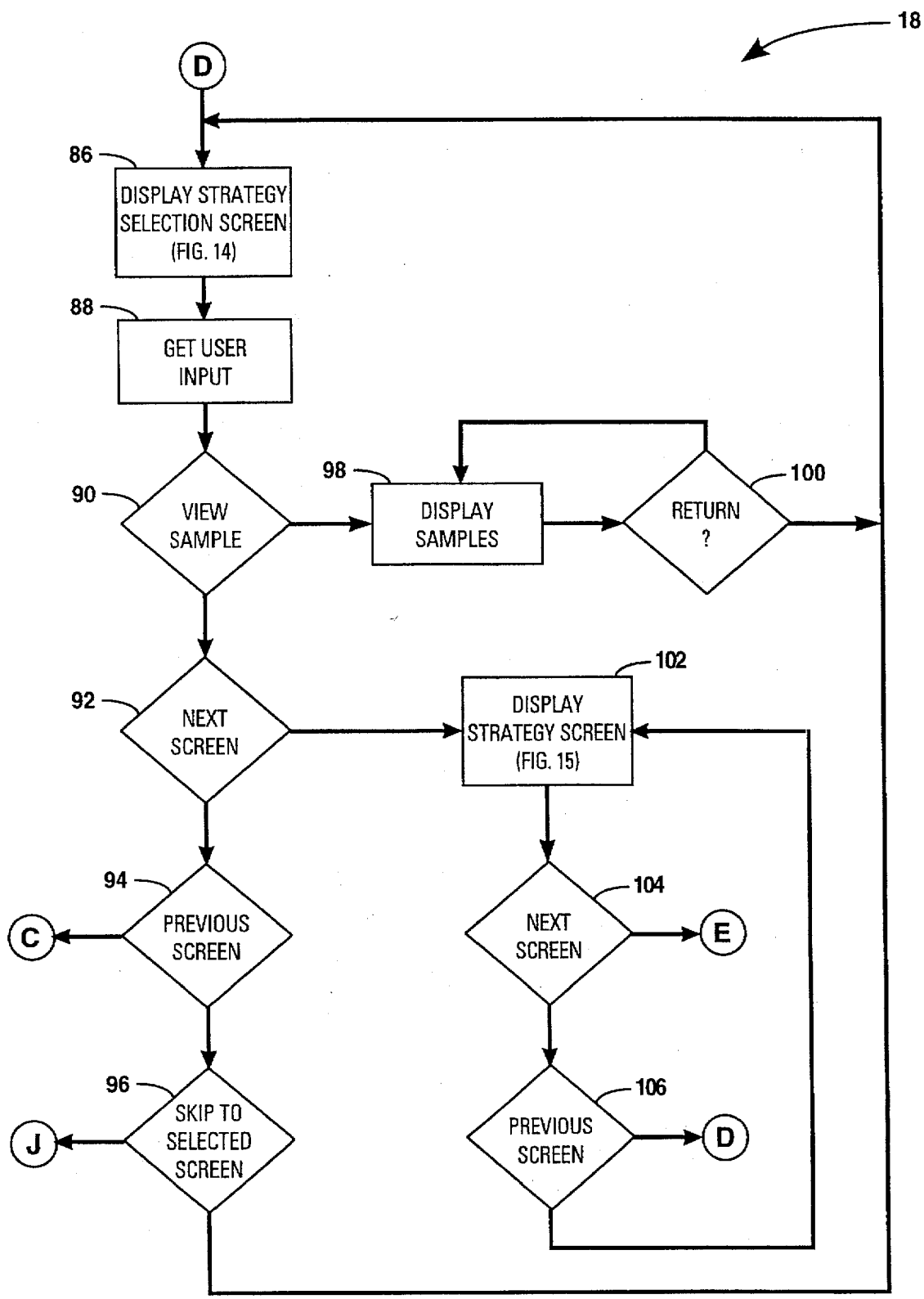
FIG. 5 is a flow diagram of the strategy module of the program.
Figure 6:
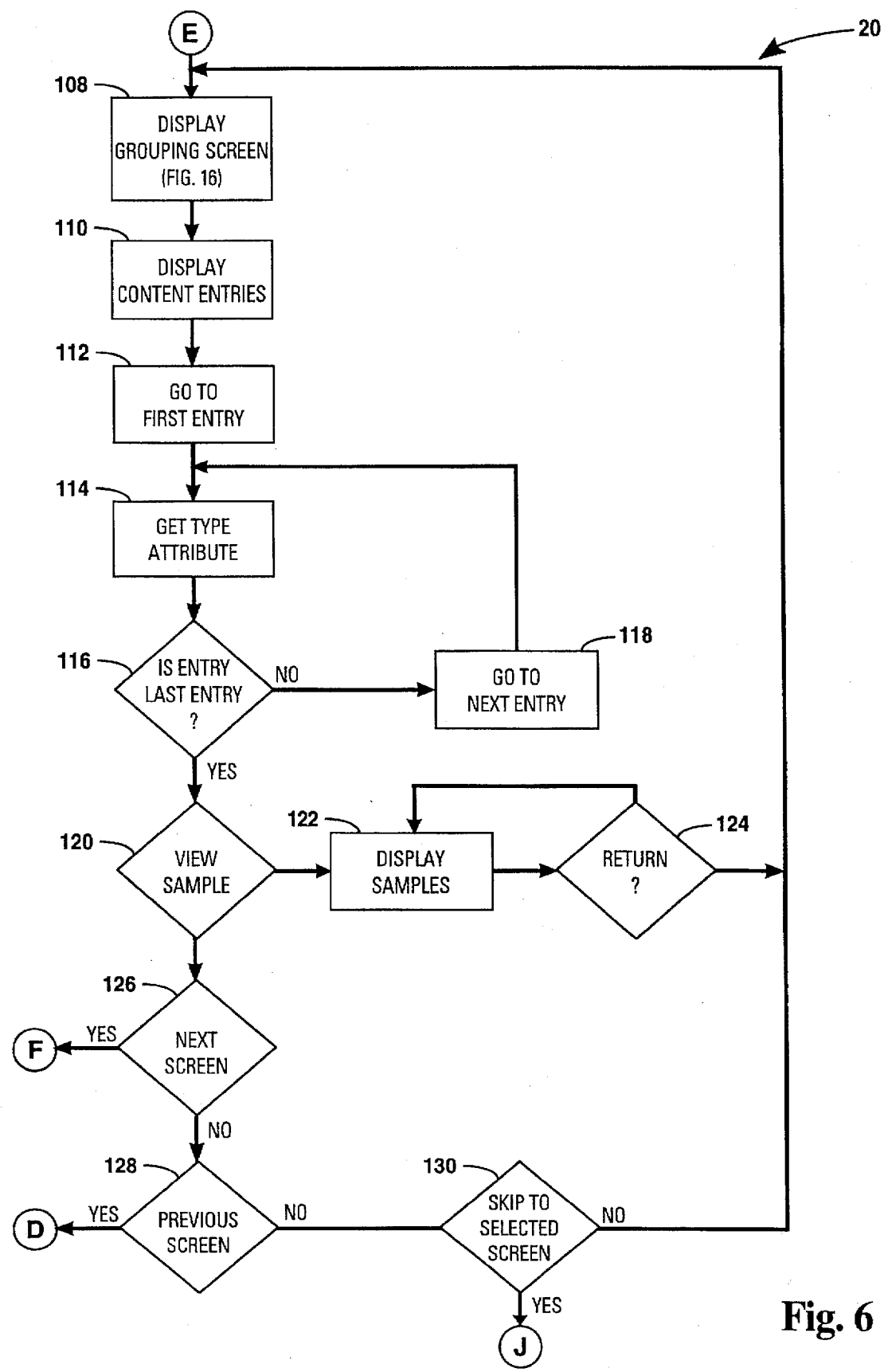
FIG. 6 is a flow diagram of the grouping module of the program.
Figure 7:
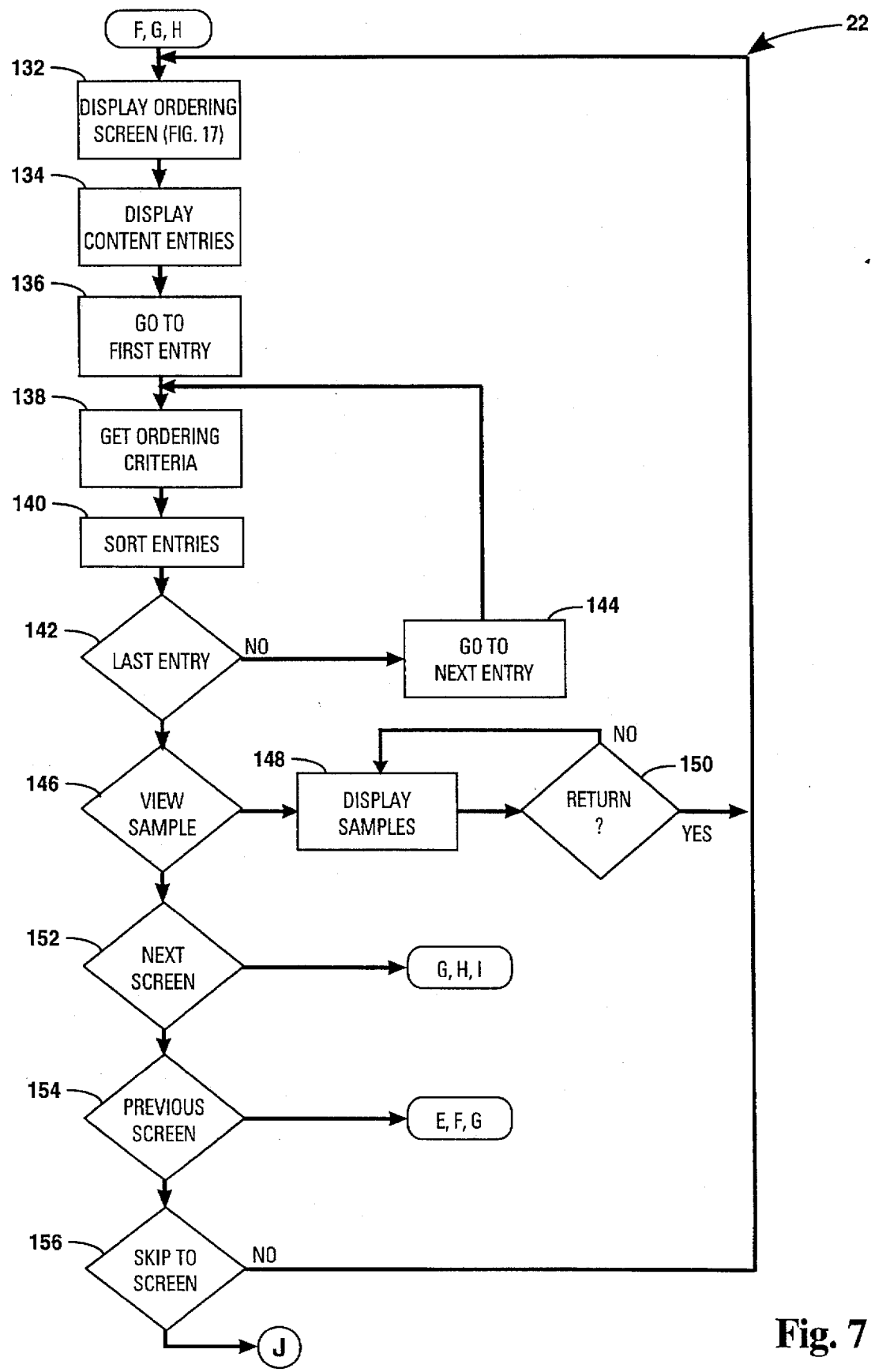
FIG. 7 is a flow diagram of the ordering module of the invention.

The outlining method is implemented through computer software. FIG. 1 shows a flow diagram illustrating the primary functional components of the outlining program. The program functions are conceptually divided into seven program modules—the audience module 12, the purpose module 14, the content module 16, the strategy module 18, the grouping module 20, the ordering module 22 and the display module 24. The default program flow is sequential. That is, program control passes from one module to the next adjacent module until the last module is reached. This program flow encourages the user to go through each step in the process outlined above. However, the user can elect to skip one module or to execute the modules out of sequence. For this purpose, each of the modules is connected to a main program loop to allow the users to go from one module to another module in any desired sequence. FIGS. 2–7 illustrate in more detail the operations depicted by each module in FIG. 1. The audience module 12 is shown in FIG. 2, the purpose module 14 is shown in FIG. 3, the content module 16 is shown in FIG. 4, the strategy module 18 is shown in FIG. 5, the grouping module 20 is shown in FIG. 6, and the ordering module 22 is shown in FIG. 7.

Upon entering the audience module (FIG. 2), an audience screen is displayed to the user (26). The audience screen is shown in FIG. 8. The audience screen prompts the user to enter the target audience and extended audience of the business communication and the user's keyed-in responses are stored (28). Identification of the audience is necessary so that the writer takes into account the audience's priorities, interests and expectations. The user has the option of entering more detail prior to continuing to the next screen (30). Alternately, the user may elect to continue to the next screen (32) or go to a selected screen (42). If the user selects NEXT from the audience screen, program controls passes to the purpose module 14 shown in FIG. 3. If the user selects another screen, program control passes to the designated screen.

Figure 9:
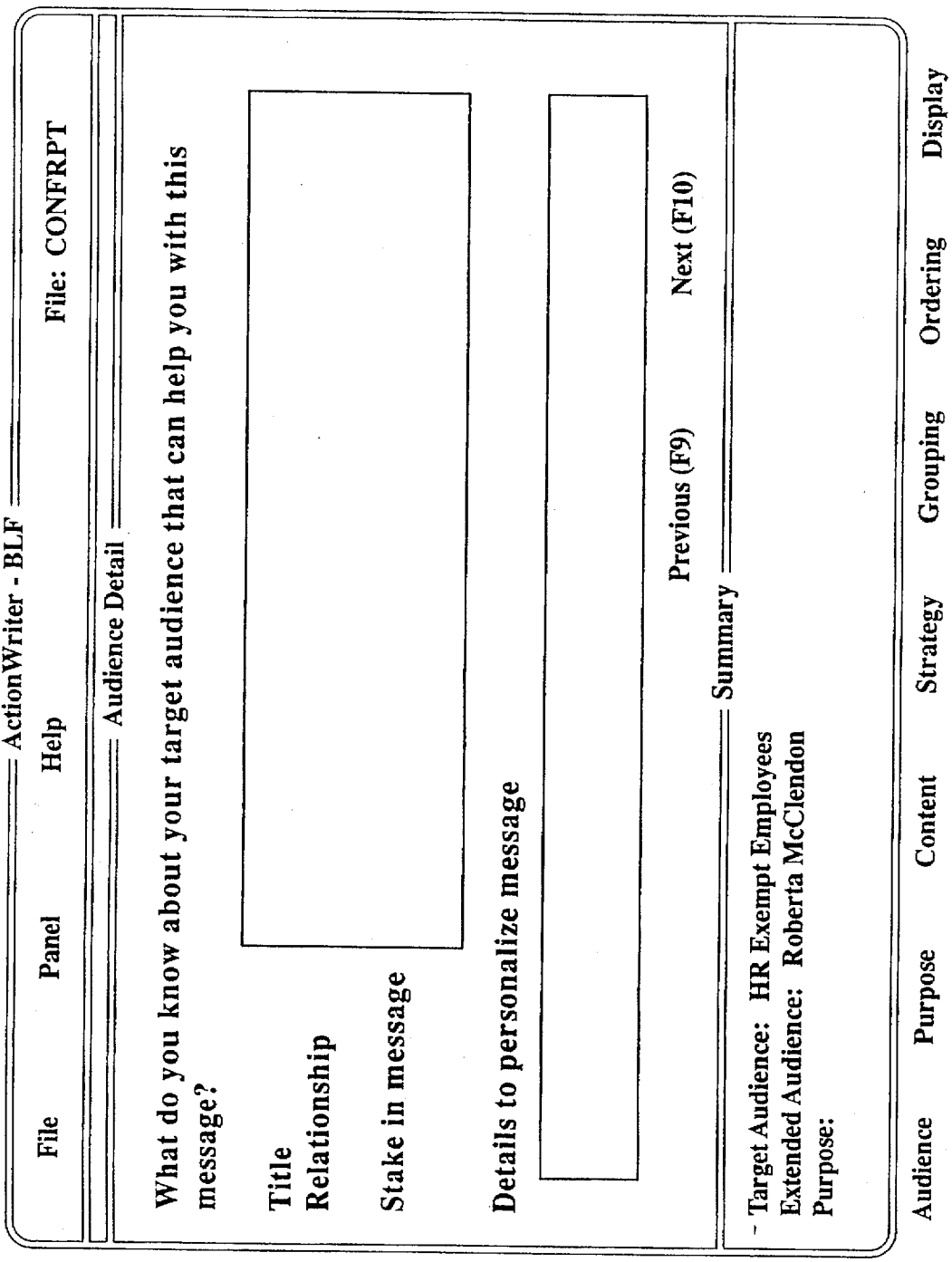
FIG. 9 is a pictorial representation of the audience detail screen.

If the user elects to enter more detail, an audience detail screen (FIG. 9) is displayed to the user (34). The audience detail screen prompts the user to enter additional detail concerning the audience such as the recipient's title, his or her relationship to the writer, his or her stake in the message, and any notes to personalize the message. The responses keyed-in by the user are stored (36). From the audience detail screen, the user has the option of returning to the previous screen (38), or continuing to the next screen (40). If the user elects PREVIOUS from the audience detail screen, he or she is returned to the audience screen. If the user elects NEXT from the audience detail screen, the audience module 12 is exited and program control passes to the purpose module 14.

Upon entering the purpose module 14 (FIG. 3) the purpose screen shown in FIG. 10 is displayed to the user (44).

The purpose screen prompts the user to enter the purpose of the communication and receives the user's input (46). Entering the purpose of the communication is necessary to establish both short-term and long-term goals for the communication. After keying in his or her responses, the user has the option of continuing to the next screen (52), returning to the previous screen (54), or skipping to a selected screen (56). If the user selects NEXT from the purpose screen, program control passes to the content module 16. If the user selects PREVIOUS, program control returns to the audience module 12. If the user selects another screen, the purpose module 14 is exited and control passes to the designated module.

From the purpose screen, the user may also elect to go to a detail screen (48) for entering more detailed information about the purpose of the communication. If the user chooses to enter more detail, a purpose detail screen (FIG. 11) is displayed to the user (58). The purpose detail screen prompts the user to enter additional information regarding to the purpose of the communication and receives the user's keyed-in responses (60). From the purpose detail screen, the user may elect to return to the previous screen (66) or to continue to the next screen (64). If the user selects PREVIOUS from the purpose detail screen, he or she is returned to the purpose screen. If the user selects NEXT from the purpose detail screen, the purpose module 14 is exited and program control passes to the content module 16.

From either the purpose screen or the purpose detail screen, the user may elect to go to a long-term purpose screen (50, 62). The long-term purpose screen prompts the user to enter specific information regarding how the present communication will advance the long-term purpose and receives the user's responses (70). The user has the option of continuing to the next screen (72) or returning to the previous screen 74. If the user selects NEXT from the long-term purpose screen, program control passes to the content module (16). If the user selects PREVIOUS from the long-term purpose screen, the purpose detail screen is displayed (58).

The user enters the content module 16 (FIG. 4) when the NEXT command is selected from the purpose screen, the purpose detail screen, or the long-term purpose screen. Upon entering the content module 16, the content screen (FIG. 13) is displayed to the user (76). On the content screen, the user lists briefly the ideas that support the user's purpose and convey the desired message. Key words and short phrases are typically used to convey the main points of the communication. The program should allow the user to list up to 20 separate content entries, which should be sufficient for most business communications. The content entries entered by the user are stored by the computer (78). Each content entry may represent a complete one sentence paragraph, a complete sentence, or part of a more complex sentence. The content entries can be entered in random order.

After keying in the content entries, the user has the option of continuing to the next screen (80), returning to the previous screen (82), or skipping to a selected screen (84). If the user selects NEXT from the content screen, program control passes to the strategy module 18. If the user selects PREVIOUS, program control is returned to the purpose module 14. The user may also skip to a selected screen. For example, more experienced users already familiar with the organizational strategies may wish to skip the strategy module 18 and go directly to the grouping module 20.

Figure 14:
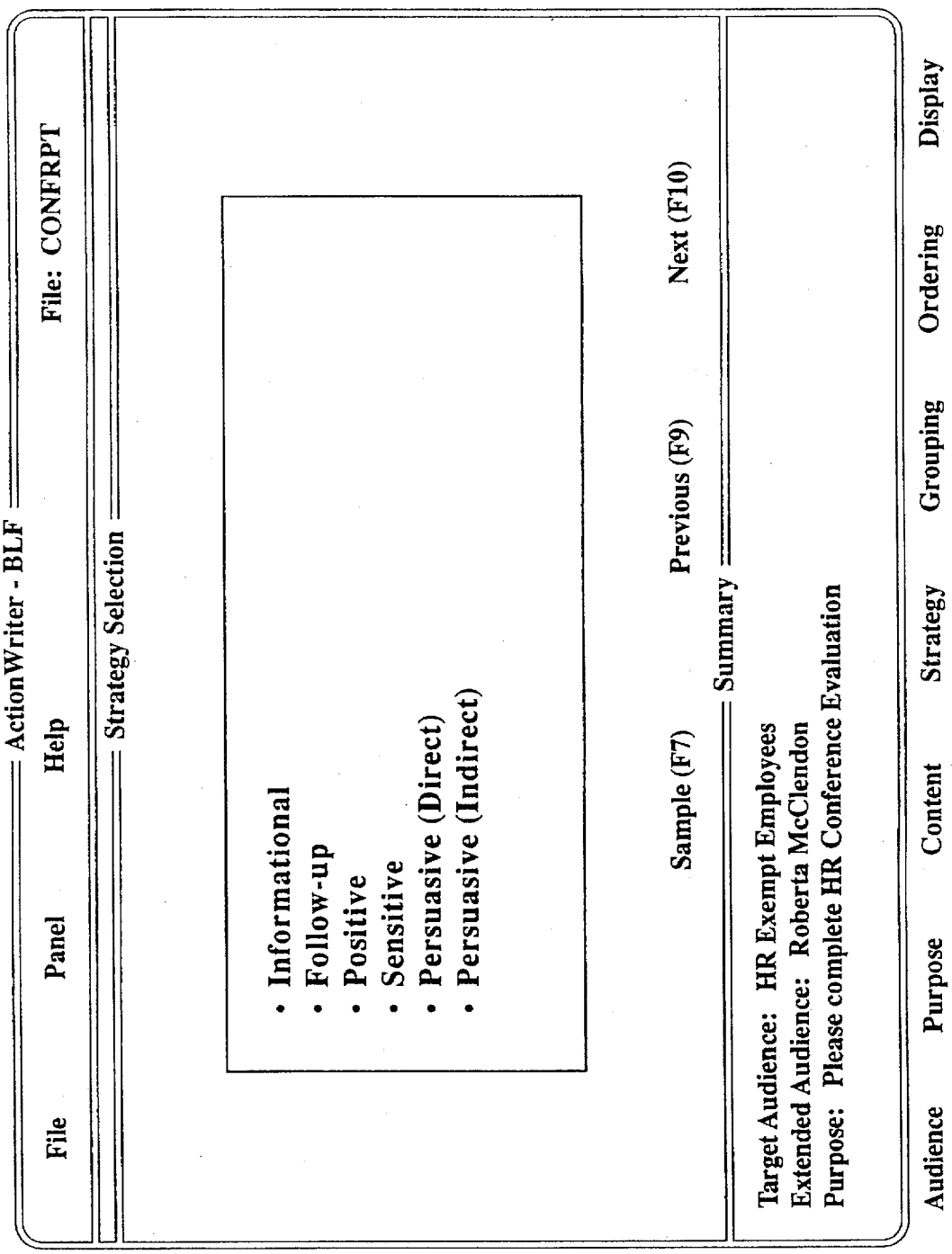
FIG. 14 is a pictorial representation of the strategy selection screen.

If the user selects NEXT from the content screen, program control passes to the strategy module 18 (FIG. 5). In the strategy module 18, the user is initially presented with a strategy selection screen (86). The strategy selection screen is shown in FIG. 14. The strategy selection screen will typically include a "pick list" of available strategies to choose from. The user is given five basic organizational strategies from which to choose: informational, follow-up, positive, sensitive, persuasive (direct and indirect). To assist the user in selecting the appropriate strategy, the user has access to samples of letters or correspondence based on each strategy. After the user selects a strategy (88), the user has the option of viewing samples based on the selected strategy (90). If the user elects to view the samples, the appropriate samples based on the selected strategy are displayed (98). After browsing through the samples, the user selects return (100) to go back to the strategy selection screen. The user has the option of selecting another strategy and viewing additional samples.

After selecting an appropriate strategy, the user has the option of continuing to the next screen (92), returning to the previous screen (94) or skipping to a selected screen (96). If the user selects PREVIOUS from the strategy selection screen, program control is returned to the content module 16. If the user selects NEXT, a strategy screen is displayed to the user corresponding to the selected strategy (102). The strategy screen includes guidelines for organizing the content entries previously entered by the user. These guidelines include the purpose, focus issues, and organizational pattern associated with the selected strategy. An example of one strategy screen is shown in FIG. 15. By using an organizational pattern or strategy, it is possible to control the impact of the user's message on his or her audience. The strategy screen provides details about the selected strategy and guidelines on using the selected strategy. These guidelines assist the user in organizing the content entries previously entered.

From the strategy screen, the user may elect to continue to the next screen (104) or to return to the previous screen (106). If the user selects PREVIOUS from the strategy screen, the user is returned to the strategy selection screen. The user may want to return to the strategy selection screen to make an alternative selection. If the user selects NEXT from the strategy screen, the strategy module 18 is exited and program control passes to the grouping module 20.

Upon entering the grouping module 20 (FIG. 6), a grouping screen is displayed to the user (108). The grouping screen is shown in FIG. 16. A list of the content entries previously entered by the user is displayed on the grouping screen (110). The cursor is placed adjacent to the first entry (112), and the user is prompted to enter a type attribute for the first entry. The type attribute entered by the user is stored (114) and the program checks whether the current entry is the last entry (116). If the current entry is not the last entry, the cursor is moved to the next entry (118), and the user is again prompted to enter a type attribute for that entry. This process is repeated until the last entry is reached.

The outlining method of the present invention utilizes three type attributes which provide the foundation for each of the organizational strategies. The accepted type attributes are connect (C), support (S), and follow-through (F), which are used in all of the organizational strategies to organize the content entries. In all six organizational strategies, the connect items are used to create a link between the writer and the reader. The connect begins the document with what is most important to the reader and establishes or reinforces the document's purpose. The support items develop, illustrate or explain the main points made in the connect section. The follow-through items set up a clear next step for the reader by establishing a time frame, deadline or action.

The user has the option from the grouping screen to view samples based on the selected strategy (120). If the user selects SAMPLES from the grouping screen, samples based on the selected strategy are displayed to the user (122). After browsing through the samples, the user may elect RETURN (124) to return to the grouping screen.

After assigning type attributes to each content entry, the user has the option of continuing to the next screen (126), returning to the previous screen (128), or skipping to a selected screen (130). If the chooser selects PREVIOUS from the grouping screen, program control returns to the strategy module 18. If the user selects NEXT, program control is passed to the ordering module 22. Any content entry not assigned a type attribute remains in memory, but does not advance to ordering.

FIG. 7 illustrates in some detail the sequence of operations in the ordering module. The ordering module 22 consists of three sub-modules—one sub-module for each type attribute. The sequence of operations in each sub-module is the same. Accordingly, only the sequence of the first sub-module is described in detail, it being understood that the remaining sub-modules are the same.

Upon entering the ordering module, the "ordering connect" screen is displayed (132). The "ordering connect" screen is shown in FIG. 17. The content entries assigned the type attribute "connect" are displayed (134). The cursor is automatically moved to the first content entry (136) and the user is prompted to enter ordering criteria. A "P" (for "paragraph") is entered adjacent to each main idea. The paragraphs are automatically numbered in the order in which the assignments are made. Then, the detail ideas are assigned to a paragraph by entering the paragraph number. Changes in any paragraph assignment can be made by entering a new number. As ordering criteria is entered (138) the content entries are sorted (140) and the screen is refreshed to reflect the new order. The computer then checks whether the current content entry is the last entry (142). If the content entry is not the last entry, the cursor is moved to the next entry (144) and the user is prompted to enter ordering criteria for the next entry.

While entering ordering criteria, the user may elect to view samples (146) based on the selected strategy. If the user selects SAMPLES from the ordering screen, samples based on the selected strategy are displayed to the user (148). After browsing through the samples, the user can select RETURN (150) to go back to the ordering screen.

After entering ordering criteria for each content entry in the connect attribute grouping, the user can select to continue to the next screen (152), return to the previous screen (154), or skip to a selected screen (156). If the user selects NEXT, another ordering screen is displayed for the support attribute grouping. If the previous screen is selected, program control is returned to the grouping module 20. Any content entry not assigned an ordering criteria remains in memory, but does not advance to the outline.

This process is repeated for the content entries assigned the "support" attribute and for the content entries assigned the "follow-through" attribute. The only difference is that the NEXT screen and PREVIOUS screen commands pass control to different points in the program. While ordering the content entries in the support attribute grouping, selecting NEXT causes the ordering screen for the "follow-through" attribute grouping to be displayed. Selecting PREVIOUS causes the ordering screen for the "connect" attribute grouping to be displayed. While in the ordering screen for the "follow-through" attribute grouping, selecting NEXT causes program control to pass to the display module. Selecting PREVIOUS causes the ordering screen for the "support" attribute grouping to be displayed.

After ordering criteria have been assigned to each attribute grouping, program control passes to the display module (FIG. 1 ) which displays the sorted outline to the user. This display screen is shown in FIG. 18.

To provide a fully functional program, standard input and output functions must also be included in the program. For example, the program should include at a minimum the ability to save files, retrieve previously saved files, print files, and export files to other word-processing programs. Since these operations are standard in most outlining programs and are well-known to those skilled in the art, these standard file operations are not described in detail.

The outlining method of the present invention provides a structured approach to writing business communications which will result in more effective business communications. Using the outline produced by this method, letters and other business communications can be completed more quickly.

Based on the foregoing, it is apparent that the present invention provides a useful outlining method to assist users in developing strategy-specific outlines for business communications. The outlining method enables business users to write more effective communications in less time, resulting in an increase in productivity. While the disclosed embodiment is intended specifically for business communications, the same method can be adapted to other types of communications.

What is claimed is:

1. A guided outlining method for a computer system having input means for entering data, data storage means for storing data, and a display means, said outlining method comprising:

(a) presenting a first prompting screen on said display means for entering content entries representing ideas to be included in a document;

(b) entering with said input means a plurality of content entries;

(c) storing the content entries in said data storage means of said computer;

(d) displaying a second prompting screen on said display means for selecting an organizational strategy from a predefined list of organizational strategies, wherein said organizational strategies include a set of organizational rules for ordering the content entries;

(e) selecting with said input means an organizational strategy from said predefined list of organizational strategies;

(f) presenting on said display means organizational rules stored in said data storage means of said computer which correspond to the selected organizational strategy;

(g) presenting a third prompting screen on said display means for assigning ordering criteria to said content entries;

(h) assigning ordering criteria to said content entries by entering said criteria with said input means following the organizational rules for the selected organizational strategy;

(i) sorting the content entries in said computer based on the assigned ordering criteria to produce a sorted outline; and (j) outputting the sorted outline to an output device.

2. The outlining method of claim 1 wherein the step of sorting the content entries includes classifying the main ideas and subordinate ideas among said content entries by entering priority codes into said computer corresponding to said content entries.

3. The outlining method according to claim 2 further including the step of associating each of the subordinate ideas among said content entries with one of the main ideas among said content entries.

4. The outlining method of claim 3 wherein the step of sorting the content entries includes entering a first set of ordering criteria for sorting the main ideas among said content entries in relation to each other and, for each main idea, entering a second set of ordering criteria for ordering the subordinate ideas in relation to one another.

5. The outlining method of claim 1 further including the steps of assigning a type attribute to the content entries, and grouping the content entries by type attribute before assigning ordering criteria to the content entries.

* * * * *